United States Patent
Wang et al.

(10) Patent No.: US 12,481,689 B1
(45) Date of Patent: Nov. 25, 2025

(54) MODIFYING A USER QUERY TO PREVENT HALLUCINATIONS

(71) Applicant: Palo Alto Networks, Inc., Santa Clara, CA (US)

(72) Inventors: Bin Wang, Santa Clara, CA (US); Sayali Pradip Kamat, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/819,708

(22) Filed: Aug. 29, 2024

(51) Int. Cl.
  *G06F 16/30* (2019.01)
  *G06F 16/3329* (2025.01)
  *G06F 16/335* (2019.01)

(52) U.S. Cl.
  CPC ........ *G06F 16/335* (2019.01); *G06F 16/3329* (2019.01)

(58) Field of Classification Search
  CPC .......................... G06F 16/335; G06F 16/3329
  See application file for complete search history.

(56) References Cited

U.S. PATENT DOCUMENTS

| | | | |
|---|---|---|---|
| 11,301,502 B1 * | 4/2022 | Dijamco | G06F 16/334 |
| 12,277,457 B1 | 4/2025 | Shetty | |
| 12,437,022 B1 | 10/2025 | Gehly | |
| 2015/0161241 A1 * | 6/2015 | Haggar | G06Q 10/10 707/723 |
| 2024/0411752 A1 * | 12/2024 | Prabhakar | H04L 41/0895 |
| 2025/0061286 A1 * | 2/2025 | Zhou | G06F 40/30 |
| 2025/0068857 A1 | 2/2025 | Lakshmikanthan | |
| 2025/0077509 A1 * | 3/2025 | Schindel | G06F 16/243 |
| 2025/0094439 A1 * | 3/2025 | Telling | G06F 16/243 |
| 2025/0124024 A1 * | 4/2025 | Kirk | G06F 21/602 |
| 2025/0139088 A1 | 5/2025 | Weik | |

OTHER PUBLICATIONS

Article entitled "SQL Error: relation "schema.table" does not exist", by LookerExperts, dated Jul. 2, 2021 (Year: 2021).*
Article entitled "CRUSH4SQL: Collective Retrieval Using Schema Hallucination for Text2SQL", by Kothyari et al., dated Nov. 2, 2023 (Year: 2023).*
Jovicic et al., Make Model Driven Network Automation Pythonic, Term Project, Department of Computer Science, OSt—University of Applied Sciences, Campus Rapperswil-Jona, Dec. 23, 2022, 72 pages.

* cited by examiner

*Primary Examiner* — Mahesh H Dwivedi
(74) *Attorney, Agent, or Firm* — Van Pelt, Yi & James LLP

(57) ABSTRACT

A user query that includes a natural language description is received. It is determined that the user query is an improper request for information. In response to a determination that the user query is the improper request for information, a proper request for information is generated.

6 Claims, 9 Drawing Sheets

600

You are an assistant who helps to write http requests. You need to follow the given API specification strictly.
The API of '{{{ endpoint }}}' is used to obtain the answer. The method is {{{method}}}.
Metadata about service
{{{service_metadata)}}}
The output should be formatted as a JSON instance that conforms to the JSON schema below.
As an example, for the schema {"properties": {"foo": {"title": "Foo", "description": "a list of strings", "type": "array", "items":{"type": "string"}}}, "required": ["foo"]}
the object {"foo": ["bar", "baz"]} is a well-formatted instance of the schema. The object {"properties": {"foo": ["bar", "baz"]}} is not well-formatted.
Here is the output schema:
```
schema: { {{{schema_properties}}} }
```
The data type definitions that is being used are:
{{{schema_definitions}}}
SEVERITY_S10 is critical, SEVERITY_S20 is warning,
SEVERITY_S30 is healthy, info or informational.
Query - '{{{ query }}}'. Add parameters tsg_id, aiops_id in the request.
The value of tsg_id is '{{{ tsg_id }}}' and aiops_id is '{{{ aiops_id }}}'.
What's the http request in json form?
Example of a http request:
```
{{{example}}}
``` Keep the fields minimal and skip the fields if not provided the request. Make sure body field in request is JSON string. Provide the HTTP JSON request. Do not include " ' " or " ''' " in the response.

FIG. 6

1) show me all the open alerts on ngfws with a priority of P1 and critical

CoPilot router request:
intent: data_explore,
sub-intent: alert_status,
entities: {"product": "ngfw", "feature": ["list"], "priority": "P1", "severity": "critical"}, query: "show me all the open alerts on ngfws with a priority of P1 and critical"

FIG. 7A

2) show me all the open alerts on ngfws with a priority of P1 and critical on device hostname1

CoPilot router request:
intent: data_explore,
sub-intent: alert_status,
entities: {"product": "ngfw", "feature": ["list"], "priority": "P1", "severity": "critical"},
query: "show me all the open alerts on ngfws with a priority of P1 and critical on device hostname1"

FIG. 7B

3) list all the end of life ngfw devices

CoPilot router request:
intent: data_explore,
sub-intent: ?,
entities: {"product": "ngfw", "feature": []},
query: "list all the end of life ngfw devices"

FIG. 7C

4) show all of the ngfw devices whose certificate are going to expire

CoPilot router request:
intent: data_explore,
sub-intent: ?,
entities: {"product": "ngfw", "feature": []},
query: "show all of the ngfw devices whose certificate are going to expire"

FIG. 7D

Query Example:
Query: "What is the state of BPA compliance to CIS in my ngfw deployment?"
CoPilot router request:
intent: data_explore,
sub-intent: bpa,
entities: {"product": "ngfw", "feature": ["CIS", "trend"]},
query: "What is the state of BPA compliance to CIS in my ngfw deployment?"

FIG. 8

Example:
Query: show me the ngfw devices that are affected by vulnerability CVE-2021-44228
CoPilot router request:
intent: data_explore,
sub-intent: vulnerability,
entities: {"product": "ngfw", "feature": [], "cve": "CVE-2021-44228"},
query: "show me the ngfw devices that are affected by vulnerability CVE-2021-44228"

FIG. 9

Query Example:
What are the upgrade paths for devices in version 10.2.1?
What CVEs will impact if I upgrade my device to 10.5.6?

FIG. 10

Query Example:
Show me all of the high processing alerts in my deployment. (prompt will return few alerts)
Show me dataplane average cpu utilization trend for s1dp1 for alert xyz
Show me RCA for alert xyz
What is the evidence for alert xyz?
Why is alert xyz still open?

FIG. 11

Query Example:
How is my DP CPU capacity predicted over the next 90 days for device hostname1?
What is the current and next 30 days capacity looks for global protect clientless tunnel for device hostname1?
What do the service groups look like on host hostname1?

FIG. 12

Query Example:
Show me overall feature adoption for my deployment
Show me the rules with credential theft prevention
Show me the rules without credential theft prevention
Show me trends for rules adopting credential theft prevention

FIG. 13

Query Example:
How many NGFWs have not activated advanced threat prevention service?
How many NGFWs licenses have expired for advanced threat prevention service?
List all the NGFWs whose licenses have expired for advanced threat prevention service?
List all the NGFWs not following best practices for advanced threat prevention service?
List all the NGFWs not configured for all the rules for advanced threat prevention service?

FIG. 14

Query Example:
How many ngfw devices are onboarded?
How many ngfw devices are currently sending the telemetry data?
Which all ngfw devices are not sending telemetry?
Which all devices are running 10.2.4?
List me all the devices with PA-220
List all ngfw devices with expired licenses

FIG. 15

Query Example:
Query: show the trend of average cpu utilization for dataplane slot1 on ngfw device hostname1
CoPilot router request:
intent: data_explore,
sub-intent: ?,
entities: {"product": "ngfw", "feature": [""]},
query: "show the trend of average cpu utilization for dataplane 1 and slot1 on ngfw device hostname1"

FIG. 16

"How healthy is ngfw device <<device>>"
"Show me the CVEs on ngfw device <<device>>"

FIG. 17

MODIFYING A USER QUERY TO PREVENT HALLUCINATIONS

BACKGROUND OF THE INVENTION

A system may be comprised of a plurality of services. A first service may receive a request from a user, but relies on a second service to provide a response. The first service may communicate with the second service on behalf of the user, but this communication method is hard coded. The user request includes one or more sentences, which may contain ambiguous natural language. Consequently, the second service may not be able to respond properly to the user request.

Hard coding the method by which the first service communicates with the second service for all potential user requests is impractical due to the vast and ambiguous nature of natural language. Additionally, hard coding restricts user options, as users can interact with the service in predefined ways. Finally, coding every potential use case is time consuming and impractical.

BRIEF DESCRIPTION OF THE DRAWINGS

Various embodiments of the invention are disclosed in the following detailed description and the accompanying drawings.

FIG. 6 illustrates an example prompt in accordance with some embodiments.

FIGS. 7A-7D illustrate examples of user queries in accordance with some embodiments.

FIG. 8 is an example of a user query in accordance with some embodiments.

FIG. 9 is an example of a user query in accordance with some embodiments.

FIG. 10 are examples of user queries in accordance with some embodiments.

FIG. 11 are examples of user queries in accordance with some embodiments.

FIG. 12 are examples of user queries in accordance with some embodiments.

FIG. 13 are examples of user queries in accordance with some embodiments.

FIG. 14 are examples of user queries in accordance with some embodiments.

FIG. 15 are examples of user queries in accordance with some embodiments.

FIG. 16 is an example of a user query in accordance with some embodiments.

FIG. 17 are examples of user queries in accordance with some embodiments.

DETAILED DESCRIPTION

Figure 1:
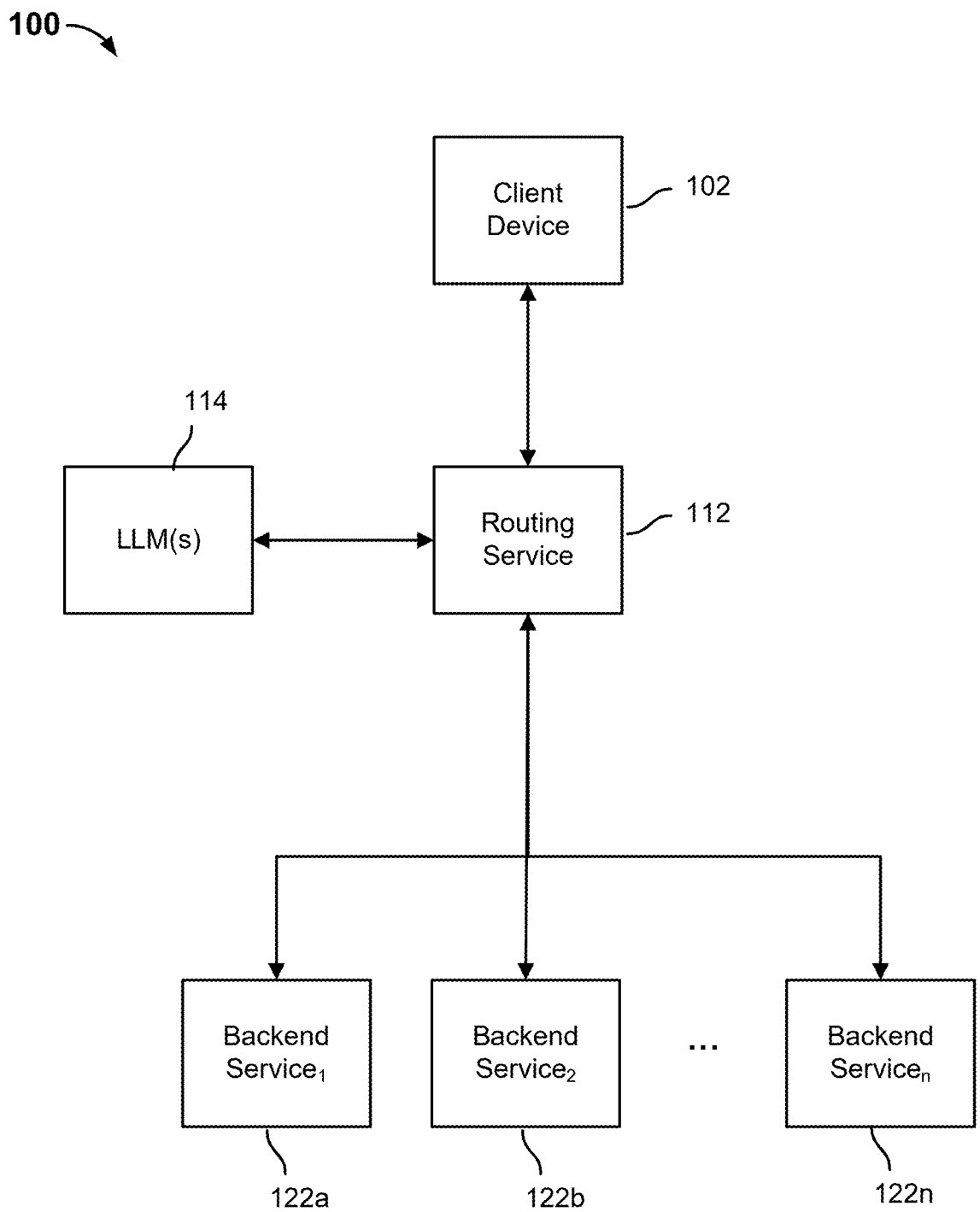
FIG. 1 is a block diagram illustrating a system to provide a response to a user query in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to provide a response to a user query are disclosed. In some embodiments, the user query includes ambiguous natural language. A routing service receives the user query and provides the user query to a large language model (LLM). In response to receiving the user query, the LLM translates the user query, if necessary, into a proper request that enables a backend service to obtain a correct response to the user query. The routing service is configured to communicate with a plurality of backend services. The routing service analyzes the user query and provides the user query to the correct backend service.

For example, the user query may be associated with telemetry data. The routing service is configured to provide the user query to a telemetry access service instead of a different backend service. In response to receiving the user query, the telemetry access service provides a response. The telemetry access service response is likely to be more accurate than a response from the different backend service because the telemetry access service is capable of answering the user query whereas the different backend service may not have the tools or resources necessary to answer the user query.

The backend service, such as a telemetry access service, includes a request processor configured to perform a series of checks on the user query. The request processor may determine whether the user query is asking the correct question. The request processor may determine whether the language included in the user query is valid. The request processor is configured to generate a prompt for an LLM so that an endpoint capable of answering the user query accurately answers the query. The prompt includes an example schema (e.g., Pydantic), related definition(s), and one or more examples.

The prompt is provided to the LLM (public, private, or hybrid). In response, the LLM generates a response that enables an endpoint associated with the backend service to answer the user query. The LLM response is provided to an action processor. The action processor causes the endpoint associated with the backend service to answer the query. In response, the endpoint associated with the backend service generates an answer to the user query and provides the answer to the action processor. The answer is formatted and provided to the routing service. The routing service provides the answer back to the client device.

FIG. 1 is a block diagram illustrating a system to provide a response to a user query in accordance with some embodiments. In the example shown, system 100 includes client device 102 that is configured to provide a user query to routing service 112. Client device 102 may be a computer, a server, a desktop, a laptop, a smartphone, a tablet, or any other computer device. Routing service 112 is configured to communicate with backend services 122a, 122b, ..., 122n. Routing service 112 is implemented on one or more servers, one or more virtual machines hosted on one or more servers, or one or more containers running on one or more servers. Although FIG. 1 depicts routing service 112 being configured to communicate with three backend services, routing service 112 may communicate with n backend services. A backend service may be deployed in a cloud environment. The cloud environment may be a public cloud, a private cloud, or a hybrid cloud. Backend services 122a, 122b, 122c may be implemented on one or more servers, one or more virtual machines hosted on one or more servers, or one or more containers running on one or more servers.

Routing service 112 is configured to route the user query to one of the backend services 122a, 122b, ..., 122n. However, the user query may be unclear. If routed to the incorrect backend service, the incorrect backend service may be unable to respond properly. Routing service 112 is configured to provide the user query to one or more LLMs 114. In response to receiving the user query, the one or more LLMs 114 are configured to translate the user query into a proper user query. The one or more LLMs 114 are configured to understand one or more of an intent, a sub-intent, a feature, and products for each user query and based on the understanding, cause routing service 112 to provide the user to one of the backend services 122a, 122b, ..., 122n. If routed to the correct backend service, the backend service is likely able to respond properly to the user query. A message may be provided to each of the backend services 122a, 112b, ..., 122n. Each backend service knows what intent and sub-intent they process. The backend service that understands the intent and sub-intent (if provided) is configured to respond to the message. The backend service that provides a response message is determined to be the correct backend service.

The backend service to which the user query is provided is configured to determine an answer to the user query and provide the answer to routing service 112. In response, routing service 112 is configured to provide the answer to client device 102.

Figure 2:
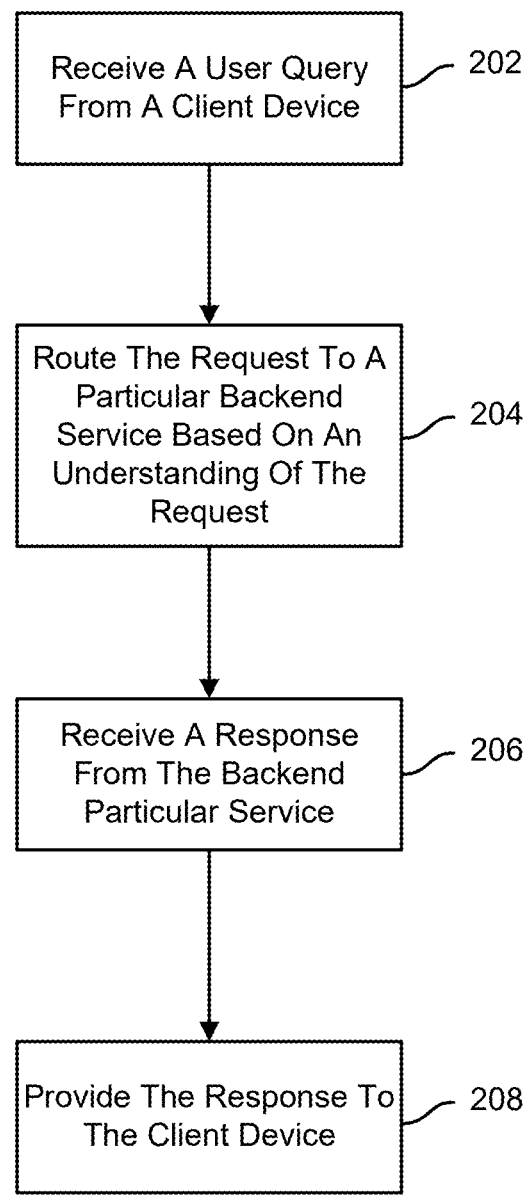
FIG. 2 is a flow diagram illustrating a process to provide a response to a user query in accordance with some embodiments.

FIG. 2 is a flow diagram illustrating a process to provide a response to a user query in accordance with some embodiments. In the example shown, process 200 may be implemented by a routing service, such as routing service 112.

At 202, a user query is received from a client device. FIGS. 7A-7D illustrate examples of user queries. In FIG. 7A, a user query of "show me all the open alerts on ngfws with a priority of P1 and critical CoPilot router request:" is received from the client device. In FIG. 7B, a user query of "show me all the open alerts on ngfws with a priority of P1 and critical on device hostname1" is received from the client device. In FIG. 7C, a user query of "list all the end of life ngfw devices" is received from the client device. In FIG. 7D, a user query of "show all of the ngfw devices whose certificates are going to expire" is received from the client device.

At 204, the user query is routed to a particular backend service based on an understanding of the request. The routing service utilizes one or more LLMs to understand the user request. The one or more LLMs may determine an intent associated with the user query, a sub-intent associated with the user query, one or more features associated with the user query, and/or product(s) associated with the user query. The user query and an understanding of the user request is provided to the particular backend service.

As seen in FIGS. 7A-7D, the one or more LLMs have determined that the corresponding intent associated with the user queries is "data_explore."

The one or more LLMs have determined that the user queries in FIGS. 7A and 7B have a corresponding sub-intent of "alert_status." As seen in FIGS. 7C and 7D, the one or more LLMs did not determine a corresponding sub-intent associated with the user queries.

The one or more LLMs have determined that the user queries in FIGS. 7A and 7B have a corresponding features of "list," "priority;" "P1", "severity:" critical" alert_status." As seen in FIGS. 7C and 7D, the one or more LLMs did not determine a corresponding feature(s) associated with the user queries.

As seen in FIGS. 7A-7D, the one or more LLMs have determined a corresponding product associated with the user queries is "ngfws." As disclosed herein, "ngfws" refers to "next-generation firewalls."

In the example shown in FIG. 7A, the routing service has received sufficient information to answer the query.

In the example shown in FIG. 7B, the LLM should be able to figure out the actual device having hostname as "hostname1." If there is not a device with hostname as "hostname1," the LLM may utilize an algorithm to find the nearest matching device having a hostname similar to "hostname1." For example, the nearest matching device may be a device having a hostname of "hostname01." This nearmatch information will also be included in query response (e.g., you requested information for X, here is information for X').

In the example shown in FIG. 7C, based on the "end of life," the LLM should be able to generate a list alert request with an alert code (e.g., S6_EOL) set as a filtering criteria.

In the example shown in FIG. 7D, the LLM should be able to generate a list alert request with an alert code (e.g., HEALTHY_CERTIFICATE) set as a filtering criteria.

At 206, a response is received from the particular backend service.

At 208, the response is provided to the client device.

Figure 3:
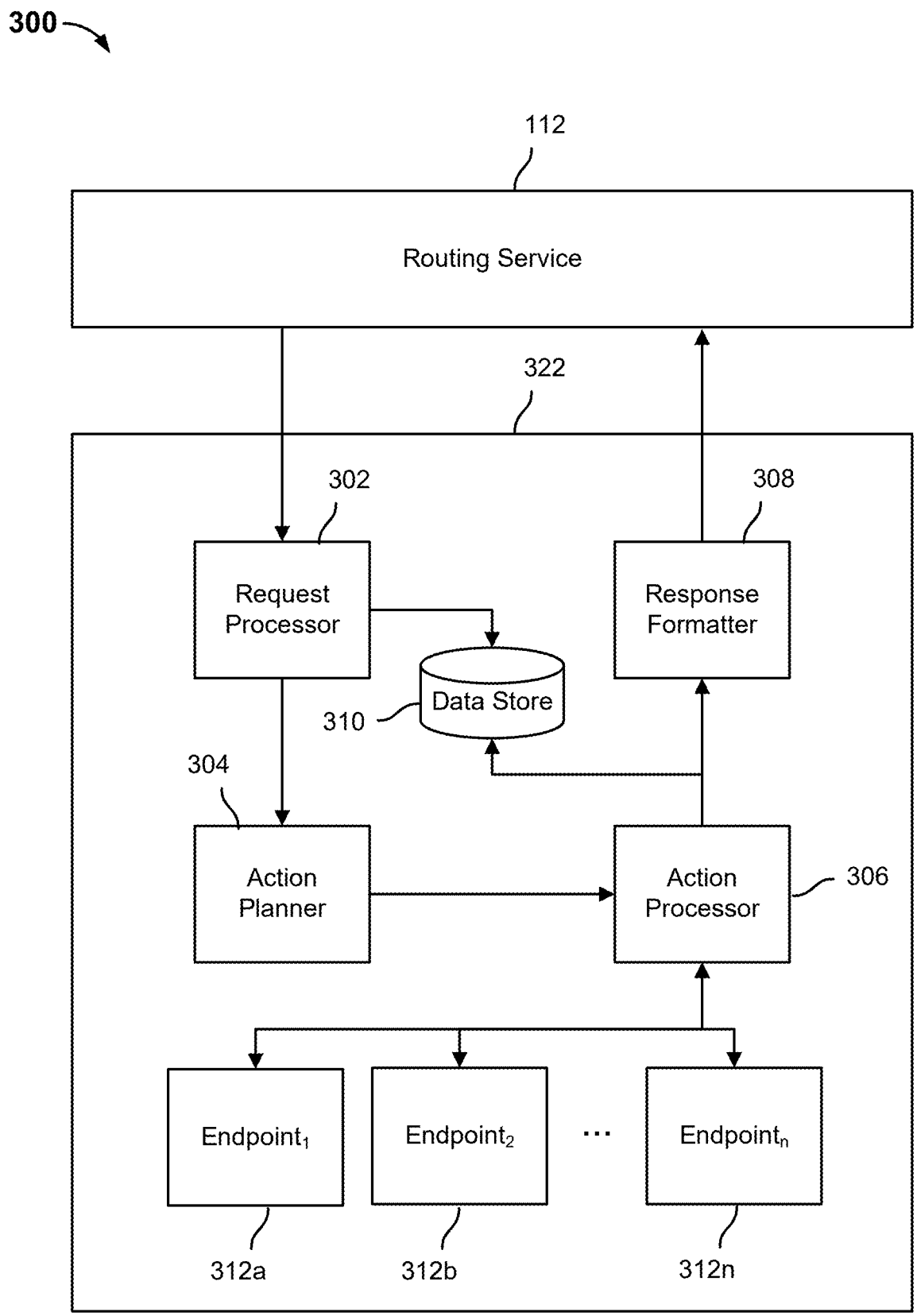
FIG. 3 is a block diagram illustrating a system to answer a user query in accordance with some embodiments.

FIG. 3 is a block diagram illustrating a system to answer a user query in accordance with some embodiments. In the example shown, system 300 includes routing service 112 and backend service 322. In some embodiments, backend service 322 is a telemetry analyzer service. In the example shown, the telemetry analyzer service 344 includes a communication interface to communicate with a routing service, such as routing service 112.

Backend service 322 includes a request processor 302 configured to receive a user query from routing service 112. In response to receiving the request, request processor 302 is configured to generate a task in data store 310.

The task may be associated with one or more particular fields. It may be possible to track a status associated with one or more particular fields, such as taskID (string-uuid), create Time (timestamp), updateTime (timestamp), taskStatus (enum-string), error (string), tsgId (string), aiopsId (string), deviceSerial, output (proto), etc. The "taskStatus" field may have a "new" value, an "in_progress" value, a "completed_with_success" value, or a "completed_with_error" value. The task value may progress from "new" to "in_progress" and then from "in_progress" to either "completed_with_success" or "completed_with_error." The generated task starts with a "new" value for the "taskStatus" field.

Router request processor 302 is configured to perform the following tasks of token validation, extract a tag (e.g., tsg_id), and validate entities. Upon successful completion of the three tasks, router request processor 302 provides the request to action planner 304. If the three tasks are not completed, router request processor 302 is configured to provide to router service 112 a notification that the query failed. Router service 112 is configured to provide the notification to client device 102.

The user query is provided to action planner 304. Action planner 304 is configured to generate a plan that will be executed by action processor 306, which leads to a final result. Action planner 304 is associated with an LLM (not shown). The LLM may be a public LLM, a private LLM, or a hybrid LLM. Action planner 304 is configured to generate a prompt for the LLM. The prompt includes an example schema and one or more examples. In some embodiments, the example schema is a Pydantic style schema. An example of a prompt is illustrated in FIG. 6. In the example shown, prompt 600 includes an example schema, one or more related definitions, and an example output. The query and the prompt are provided to the LLM.

The prompt enables the LLM to generate an API request to obtain an answer to the user query and to determine which endpoint of endpoints 312a, 312b, . . . , 312n is the correct endpoint to call. The prompt also indicates how the API request should be formatted (e.g., an HTTP request).

LLM 304 is configured to provide the API request to obtain an answer to the user query to action processor 306. In some embodiments, action processor 306 is an HTTP caller. In some embodiments, action processor 306 is a SQL command executor. In response to receiving the API request, action processor 306 is send the API request to obtain an answer to the user query to the determined endpoint. Action processor 306 is configured to provide data store 310 a notification to update a value associated with the "taskStatus" field associated with the task. In response to receiving the notification, data store 310 is configured to update a value associated with a task from "new" to "in_progress."

Action processor 306 is configured to receive a response from the determined endpoint. Action processor 306 is configured to provide data store 310 a notification to update a value associated with the "taskStatus" field associated with the task. In response to receiving the notification, data store 310 is configured to update a value associated with a task from "in_progress" to either "completed_with_sucess" or "completed_with_error." Action process 306 is configured to provide the received response to response formatter 308.

Response formatter 308 is configured to format the response into a human-readable format. In some embodiments, the response is formatted into a table. In some embodiments, the response is formatted into a graph. Response formatter 308 is configured to provide the response to router service 112, which then provides the response to a client device, such as client device 102.

In some embodiments, the user query includes a request for information associated with a parameter that does not exist in a particular schema. A prompt may be generated for the LLM to accommodate the request, however, there is no guarantee that the returned information is accurate (i.e., the returned information may be a hallucination). Action planner 304 is configured to determine whether the user query is a proper request. In response to a determination that the user query is not a proper request (i.e., includes a request for information associated with a non-existing parameter), action planner 304 is configured to generate a proper request for the information in part by generating a prompt that includes a request for information according to a particular schema and includes an instruction for one or more unknown parameters. The LLM may generate a response for the one or more unknown parameters, which may be dropped or processed after receiving the LLM response.

Figure 4:
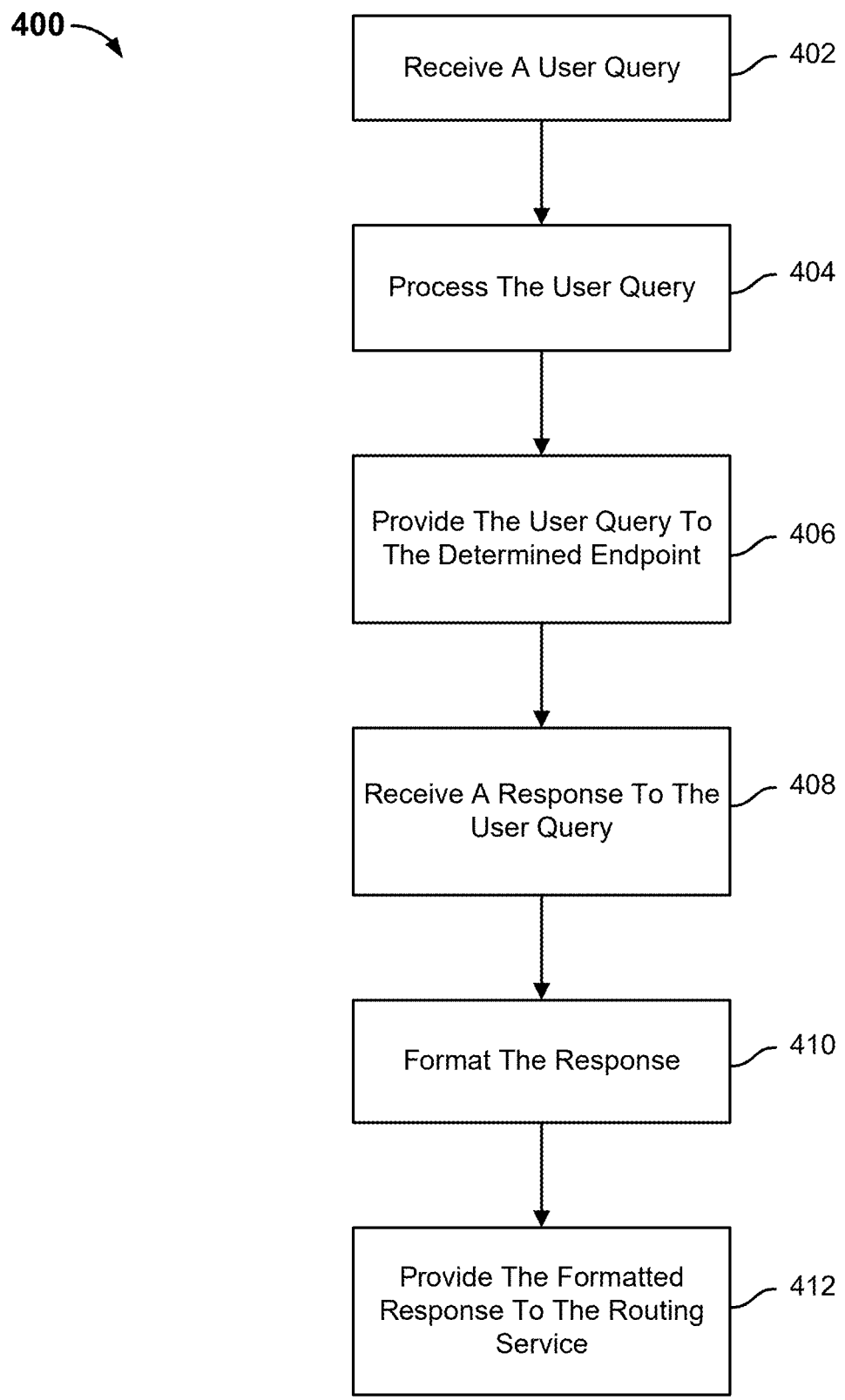
FIG. 4 is a flow diagram illustrating an embodiment of a process to answer a user query in accordance with some embodiments.

FIG. 4 is a flow diagram illustrating an embodiment of a process to answer a user query in accordance with some embodiments. In the example shown, process 400 may be implemented by a backend service, such as backend service 322.

At 402, a user query is received from a routing service.

At 404, the user query is processed. The user query is processed in part by generating a prompt for an LLM. The prompt includes an example schema and one or more examples. In some embodiments, the example schema is a Pydantic style schema. The prompt enables the LLM to generate an API request to obtain a response to the user query and to determine which endpoint to call. The user query may not be nested, but when converting the user query into an API request, the API request can have complicated fields, which has more fields. As a result, the API request may be nested. For example, the user request may be "show me all the critical alerts for the past month which has generated SASE ticket".

The API request may be:
{
start_time: 2024 Aug. 21,
end_time: 2024 Aug. 28
severity: critical,
attachments: [
    {
    type: ticket,
    creating_mode: auto,
    service: SASE
    }
]
}
Here the field of "attachments" in turn has its own fields, like "type," "creating_mode," and "service." It is more complicated than other fields like:
{
    Name: Alice
    age: 18
}

The Pydantic style schema provides a way to specify field relations in the request and enable the LLM to generate better responses. The query and the prompt are provided to the LLM. In response, the LLM generates an API request to obtain a response to the user query and determines which endpoint to call.

At 406, the user query is provided to the determined endpoint. The user query is provided to the determined endpoint using the generated API request.

At 408, a response to the user query is received.

At 410, the response is formatted. In some embodiments, the response is formatted into a human-readable format. The human-readable format may be a table, a graph, etc.

At 412, the formatted response is provided to the routing service.

Figure 5:
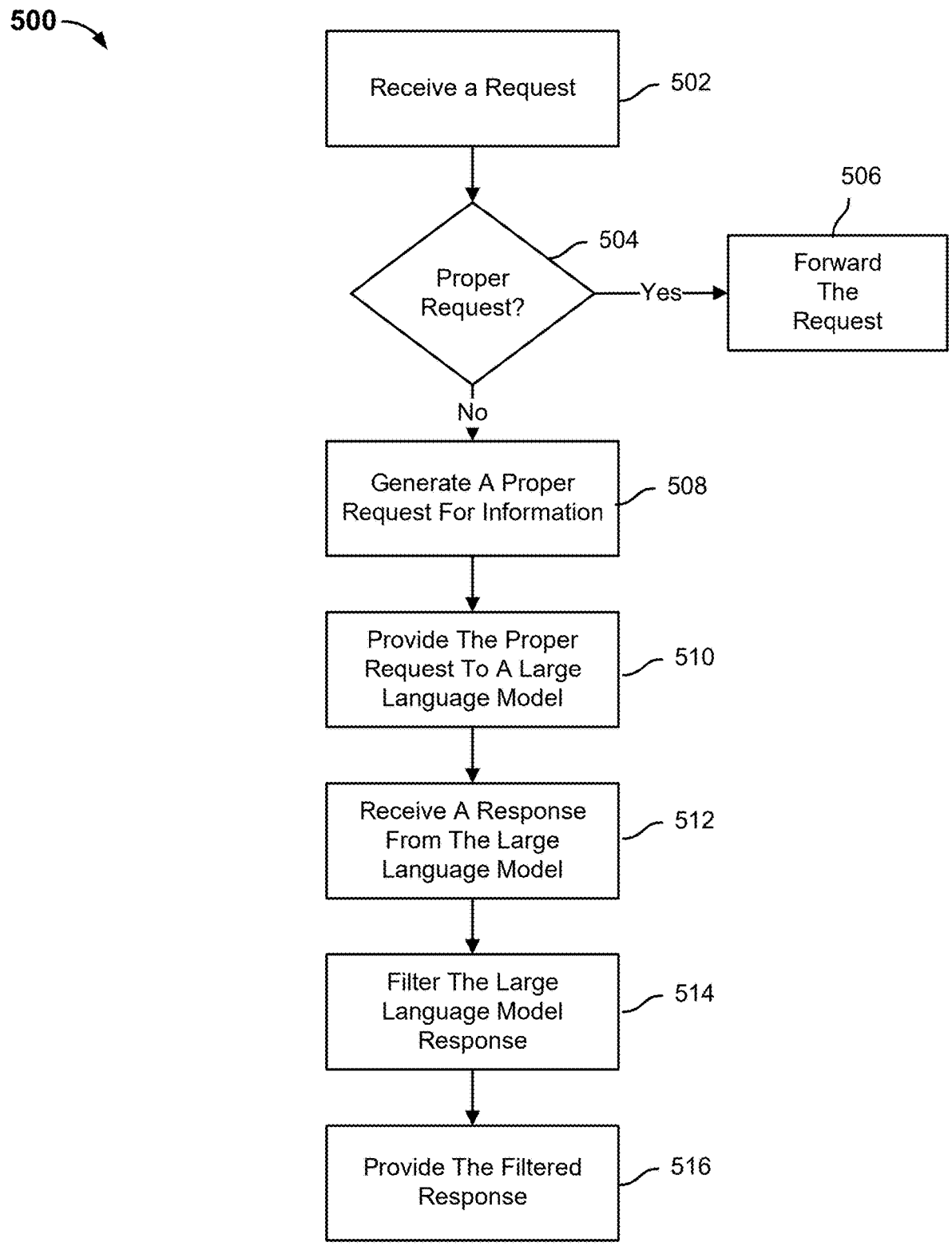
FIG. 5 is a flow diagram illustrating a process to prevent a response that includes a hallucination from being generated in accordance with some embodiments.

FIG. 5 is a flow diagram illustrating a process to prevent a response that includes a hallucination from being generated in accordance with some embodiments. In some embodiments, a LLM is utilized to generate an output based on a set of whitelisted rules. In such embodiments, it is easy for the LLM to hallucinate beyond the set of whitelisted rules. There may be two common causes. First, the pre-training material for the LLM contains some similar documentation that confuses the LLM. Second, the requirement that is given to the LLM contains something that cannot be covered within the given whitelisted rules. As a result, the LLM has to hallucinate.

In the example shown, process 500 may be implemented by an action planner, such as action planner 304. In some embodiments, process 300 is implemented to perform some step 404 of process 400.

At 502, a request is received. A user query may include a request for information associated with a parameter that does not exist. For example, the LLM may be asked to generate a HTTP request according to a given schema. The HTTP endpoint is a GET endpoint that follows the schema of "/alert?id=<alert_id>" where no other parameters are allowed except "id".

A user query of "show me the activity alert f5e55b2f for past 3 days" may be received. A prompt for the LLM based on the query may be:

You are a http request writing assistant that helps users to make http requests. You need to follow the following schema exactly to generate the correct request:
/alert?id=<alert_id>

For user query "Show me the activity on alert f5e55b2f for past 3 days."

At 504, it is determined whether the request is a proper request. Instead of generating the http request as "/alert?id=f5e55b2f," it is very easy for the LLM to hallucinate the http request as "/alert?id=f5e55b2f&start_time=3d". An invalid parameter of "start_time" is added since the user query has "for past 3 days", which cannot be fulfilled with the original schema.

In response to a determination that the request is a proper request, process 500 proceeds to 506. In response to a determination that the request is not a proper request, process 500 proceeds to 508.

At 506, the LLM prompt is generated. For example, for a query of "show me the activity alert f5e55b2f," the LLM prompt is generated as:

You are a http request writing assistant that helps users to make http requests. You need to follow the following schema exactly to generate the correct request:
/alert?id=<alert_id>

For user query "Show me the activity on alert f5e55b2f."

At 508, a proper request for information is generated. For example, the previous prompt may be modified to be:

You are a http request writing assistant that helps users to make http requests. You need to follow the following schema exactly to generate the correct request:
{
  "url":"/alert?id=<alert_id>"
}

For parameters that are not mentioned in the schema, put them into an "extra" section.

For the user query "show me the activity on alert f5e55b2f for past 3 days", the http request will be:
{
  "url":"/alert?id=<alert_id>",
  "extra":{
    "start_time":"3d"
  }
}

The parameter(s) and corresponding field(s) that may cause a hallucinated response to be generated are included in the "extra" section. This prevents the LLM from generating a hallucinated response.

At 512, a response is received from the LLM.

At 514, the LLM response is filtered. In the above example, the LLM response includes all activity on alert f5e55b2f. The LLM response is filtered by identifying a subset of the activity that corresponds to the alert activity for the last three days.

At 516, the filtered response is provided.

FIG. 8 is an example of a user query in accordance with some embodiments. An artificial intelligence for IT operations (AIOps) compliance summary service generates compliance summary reports. Users can explore trends and summary for Center for Internet Security (CIS) and National Institute of Standards and Technology (NIST) in the deployment. In some embodiments, a user query is utilized to perform a best practice assessment (BPA) check failure.

In the example shown, a user query of "What is the state of BPA compliance to CIS in my ngfw deployment?" is received. The one or more LLMs have determined that the user query has an intent of "data_explore," a sub-intent of "bpa," features of "CIS" and "trend", and a product of "ngfw." The user query and an understanding of the user request is provided to a particular backend service to generate a response to the user query.

FIG. 9 is an example of a user query in accordance with some embodiments. AIOps generate alerts on each and every device impacted by each CVEs. A TAS will answer most of the questions related to CVEs using an Incident/Alert service. In some embodiments, a user query is utilized to determine the CVEs impacting devices.

In the example shown, a user query of "show me the ngfw devices that are affected by vulnerability CVE-2021-4428" is received. The one or more LLMs have determined that the user query has an intent of "data_explore," a sub-intent of "vulnerability," a feature of "cve: CVE-2021-44228", and a product of "ngfw." The user query and an understanding of the user request is provided to a particular backend service (e.g., TAS) to generate a response to the user query.

FIG. 10 are examples of user queries in accordance with some embodiments. An AIOps backend service, such as SURE, may generate an upgrade recommendation report. The AIOps backend service lists out the upgrade path for devices based on current operating system version models, impacted CVES, etc. Users can ask questions about it.

In the example shown, a user query, such as "What are the upgrade paths for devices in version 10.2.1?" or "What CVEs will impact if I upgrade my device to 10.5.6?" may be received. The one or more LLMs may determine a corresponding intent, a correspond sub-intent (if applicable), a corresponding feature, and a corresponding product.

FIG. 11 are examples of user queries in accordance with some embodiments. An AIOps backend service may generate root cause analysis (RCA) for many alerts. These RCA are based on signatures. It covers the alerts on data plane (DP)/management plane (MP)/Config/Attorney hardware (HW). Users may ask a series of questions for a given alert/incident. These include exploring the chart/trend for alert related metrics, root cause analysis (RCA), and evidence.

In the example shown, a user query, such as "Show me all of the high processing alerts in my deployment," "Show me dataplane average cpu utilization trend for s1dp1 for alert xyz," "Show me RCA for alert xyz," "What is the evidence for alert xyz?" or "Why is alert xyz still open?" may be received.

FIG. 12 are examples of user queries in accordance with some embodiments. An AIOPs backend service may analyze the capacity for resources and generate a report. Also, the AIOPs backend service may generate an alert for it. Users may ask/explore questions related to capacity.

In the example shown, a user query, such as "How is my DP CPU capacity predicted over the next 90 days for device hostname1?", "What is the current and next 30 days capacity look for global protect clientless tunnel for device hostname1?", or "What do the service groups look like on host hostname1?" may be received.

FIG. 13 are examples of user queries in accordance with some embodiments. An AIOPs backend service may generate a feature adoption report and allow users to determine which features have been adopted through one or more queries.

In the example shown, a user query, such as "Show me overall feature adoption for my development," "Show me the rules with credential theft prevention," "Show me the rules without credential theft prevention," or "Show me trends for rules adopting credential theft prevention" may be received.

FIG. 14 are examples of user queries in accordance with some embodiments. An AIOPs backend service may generate a cloud-delivery security services (CDSS) adoption report. Users may explore these reports.

In the example shown, a user query, such as "How many NGFWs have not activated advanced threat prevention service?", "How many NGFWs licenses have expired for advanced threat prevention service?", "List all the NGFWs whose licenses have expired for advanced threat prevention service?", "List all the NGFWs not following best practices for advanced threat prevention service?", or "List all the NGFWs not configured for all the rules for advanced threat prevent service?" may be received.

FIG. 15 are examples of user queries in accordance with some embodiments. An AIOPs backend service may generate an onboarded device list as well as a device list of devices which are currently sending telemetry data.

In the example shown, a user query, such has "How many ngfw devices are onboarded?", "How many ngfw devices are currently sending the telemetry data?"," "Which all ngfw devices are not sending telemetry?", "Which all device are running 10.2.4?", "List me all the devices with PA-220," or "List all ngfw devices with expired licenses" may be received.

FIG. 16 is an example of a user query in accordance with some embodiments. An AIOPs backend service stores numerous metric data points in an entity database. Users may explore these metrics, especially line metrics, to see the trends for it.

In the example shown, a user query, such as "show the trend of average cpu utilization for dataplane slot1 on ngfw device hostname1" is received. The one or more LLMs have determined that the user query has an intent of "data_explore," a sub-intent of "?," features of "[ ]", and a product of "ngfw." The user query and an understanding of the user request is provided to a particular backend service to generate a response to the user query. Based on the query, an LLM associated with the particular backend service, such as an LLM associated with action planner 404, should be able to figure out the exact metric name and action process 406 will be able to pull the corresponding trend data and return the trend data in the response.

FIG. 17 are examples of user queries in accordance with some embodiments. A TAS may a query whose answer format is fixed, but the data will vary based on the variable.

In the example shown, a user query, such as "How healthy is ngfw device <<device>>", or "Show me the CVEs on ngfw device <<device>>" may be received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 receiving a user query that includes a natural language description, wherein the natural language description includes one or more words corresponding to one or more known parameters associated with a particular schema and one or more words corresponding to an unknown parameter associated with the particular schema;
 determining that the user query is an improper request for information including by determining the user query includes the unknown parameter associated with the particular schema;
 in response to determining that the user query is the improper request for information, generating a proper request for information, wherein generating the proper request for information includes generating a prompt that utilizes a Pydantic style schema for the one or more known parameters and providing in the prompt an instruction for the unknown parameter;
 providing the prompt to a large language model;
 receiving a user query response from the large language model;
 filtering the user query response based on the unknown parameter; and
 providing the filtered user query response.

2. The method of claim 1, wherein filtering the user query response from the large language model includes determining data included in the user query response from the large language model to satisfy the request for information and removing a subset of the data included in the user query response from the large language model that does not satisfy the request for information.

3. A system, comprising:
 a processor configured to:
  receive a user query that includes a natural language description, wherein the natural language description includes one or more words corresponding to one or more known parameters associated with a particular schema and one or more words corresponding to an unknown parameter associated with the particular schema;
  determine that the user query is an improper request for information including by determining the user query includes the unknown parameter associated with the particular schema;
  in response to determining that the user query is the improper request for information, generate a proper request for information, wherein to generate the proper request for information, the processor is configured to generate a prompt that utilizes a Pydantic style schema for the one or more known parameters and providing in the prompt an instruction for the unknown parameter;
provide the prompt to a large language model;
receive a user query response from the large language model;
filter the user query response based on the unknown parameter; and
provide the filtered user query response; and
a memory coupled to the processor and configured to provide the processor with instructions.

4. The system of claim 3, wherein to filter user query response from the large language model, the processor is configured to determine data included in the user query response from the large language model to satisfy the request for information and remove a subset of the data included in the user query response from the large language model that does not satisfy the request for information.

5. A non-transitory computer readable medium and comprising computer instructions for:
receiving a user query that includes a natural language description, wherein the natural language description includes one or more words corresponding to one or more known parameters associated with a particular schema and one or more words corresponding to an unknown parameter associated with the particular schema;
determining that the user query is an improper request for information including by determining the user query includes the unknown parameter associated with the particular schema;
in response to determining that the user query is the improper request for information, generating a proper request for information, wherein generating the proper request for information includes generating a prompt that utilizes a Pydantic style schema for the one or more known parameters and providing in the prompt an instruction for the unknown parameter;
providing the prompt to a large language model;
receiving a user query response from the large language model;
filtering the user query response based on the unknown parameter; and
providing the filtered user query response.

6. The computer program product of claim 5, wherein filtering the user query response from the large language model includes determining data included in the user query response from the large language model to satisfy the request for information and removing a subset of the data included in the user query response from the large language model that does not satisfy the request for information.

* * * * *